Nov. 22, 1955  A. G. HUPP  2,724,474
MAGNETIC CLUTCH

Filed March 6, 1952  2 Sheets-Sheet 1

INVENTOR.
BY A. G. Hupp
Lieber & Lieber
ATTORNEYS.

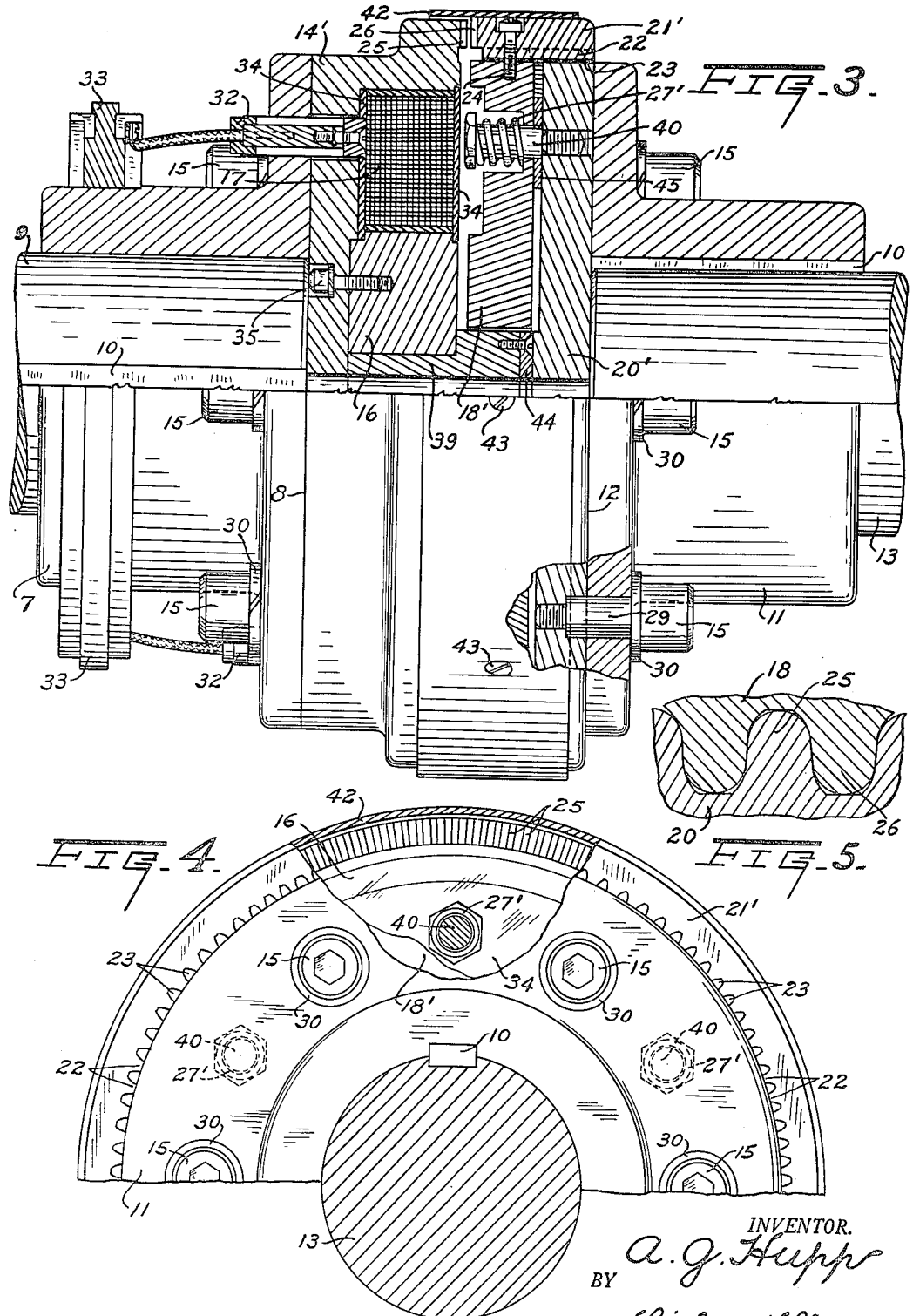

United States Patent Office 2,724,474
Patented Nov. 22, 1955

2,724,474

MAGNETIC CLUTCH

Arleigh G. Hupp, New Albany, Ind., assignor to Dings Magnetic Separator Co., Milwaukee, Wis., a corporation of Wisconsin Application March 6, 1952, Serial No. 275,175

3 Claims. (Cl. 192—90)

The present invention relates generally to improvements in mechanisms for connecting and disconnecting adjoining rotary members, and relates more particularly to improvements in the construction and operation of magnetic clutches for transmitting rotary motion from a driving shaft to a coaxial driven shaft and for effecting release of the driving connection between these shafts.

The primary object of this invention is to provide an improved magnetic clutch which is simple and compact in construction and highly efficient in operation.

As shown in Patent No. 2,055,723, granted September 29, 1936, it has heretofore been proposed to provide a magnetic clutch assemblage for transmitting rotation from a driving shaft to a coaxial driven shaft and comprising spaced driving and driven members mounted upon the respective shafts and having therebetween an electromagnet secured to the driving member and cooperating through annular sets of serrations with an armature movable along the shaft axis and directly connected to the driven member. While this prior magnetic clutch has proven quite satisfactory in commercial use when the rotary motion transmitting serrations were brought into engagement magnetically and were disengaged by springs, it was not well suited for use in magnetic clutches wherein the serrations are brought into driving coaction by spring means and are disengaged magnetically. Then too, it has been found that the disc-like armatures preferably employed in this type of clutch mechanism, must have free floating movements along the shaft axis; and in order to permit manufacture of such clutch assemblages at moderate cost and to enable convenient assembly and dismantling thereof, it is also extremely desirable to be able to apply and remove the electromagnet and clutch elements relative to the driving and driven members without disturbing the latter.

It is therefore an important object of the present invention to provide various improvements in magnetic clutches of the above defined general type, whereby the construction thereof is greatly facilitated, while the functioning thereof is also vastly improved.

Another important object of the invention is to provide an improved magnetic clutch unit wherein the clutch elements are effectively mechanically drivingly engaged as by powerful springs, and are electrically disengaged as with the aid of an electro-magnet.

A further important object of our invention is to provide an improved electro-magnetic clutch assemblage wherein the floating armature element is most effectively supported and guided so as to produce minimum interference with effective functioning of the magnet.

Still another important object of this invention is to provide an improved magnetic clutch assemblage comprising few simple and readily machineable parts which can be readily assembled or dismantled, without necessarily disturbing the driving and driven shafts or members of the assemblage.

An additional object of the invention is to provide an improved magnetic clutch or driving coupling adapted to be manufactured at moderate cost, and which may be converted if desired from a magnetically engaged to a spring engaged type and vice versa without interchanging the driving and driven members thereof.

These and other more specific objects and advantages of the invention will be apparent from the following detailed description, from which it will also appear that the gist of the improvement resides in the provision of a clutch assemblage comprising driving and driven coaxial disc-like members having spaced parallel adjacent plane end surfaces, an electro-magnet having a disc-like body element coacting with and detachably secured to the plane end surface of the driving member, a disc-like armature having a supporting disc-like element coacting with and detachably secured to the plane end surface of the driven member, and a ring gear having internal teeth meshing with external peripheral teeth formed on the armature and upon one of the elements, whereby the armature is free to float along the axis of the clutch and the armature and magnet assemblage may be readily applied to or removed from the members without disturbing the latter.

A clear conception of all of the improved features constituting the present invention and of the construction and operation of several types of commercial magnetic clutches embodying the same, may be had by referring to the drawings accompanying and forming a part of this specification wherein like reference characters designate the same or similar parts in the various views.

Fig. 3 is a part sectional side elevation of an improved magnetically engaged and spring released type of clutch, showing the parts in released position;

Fig. 4 is a fragmentary end view of the clutch shown in Fig. 3, with portions broken away and sectioned to reveal the driving serrations of the magnet body element and the location of the releasing springs; and Fig. 5 is an enlarged section through several of the motion transmitting serrations preferably employed in either type of clutch.

While the clutches shown by way of illustration are especially adapted for application to adjacent ends of alined shafts of like diameter, it is not the intent to unnecessarily restrict the utility of the improved features by virtue of this limited embodiment; and it is also contemplated that specific descriptive terms employed herein be given the broadest possible interpretation consistent with the disclosure.

Figure 1:
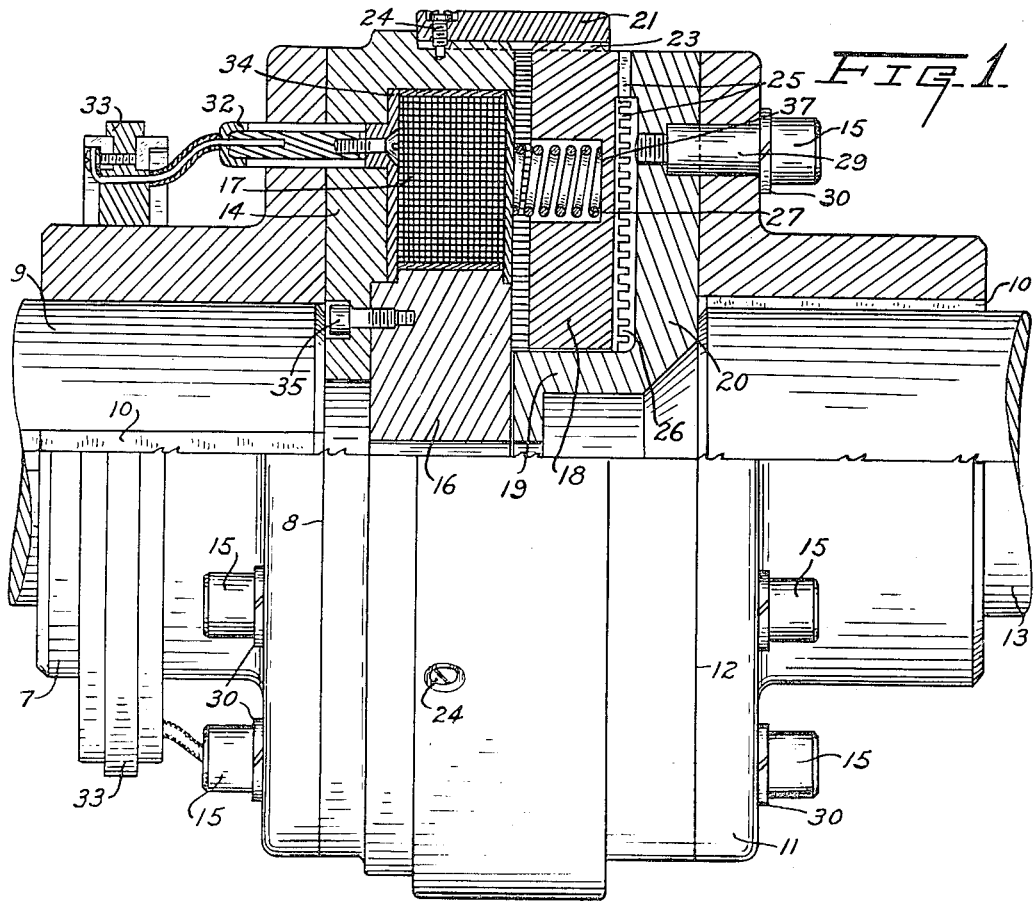
Fig. 1 is a part sectional side elevation of an improved spring engaged and magnetically released type of clutch showing the parts in driving coaction.
Figure 2:
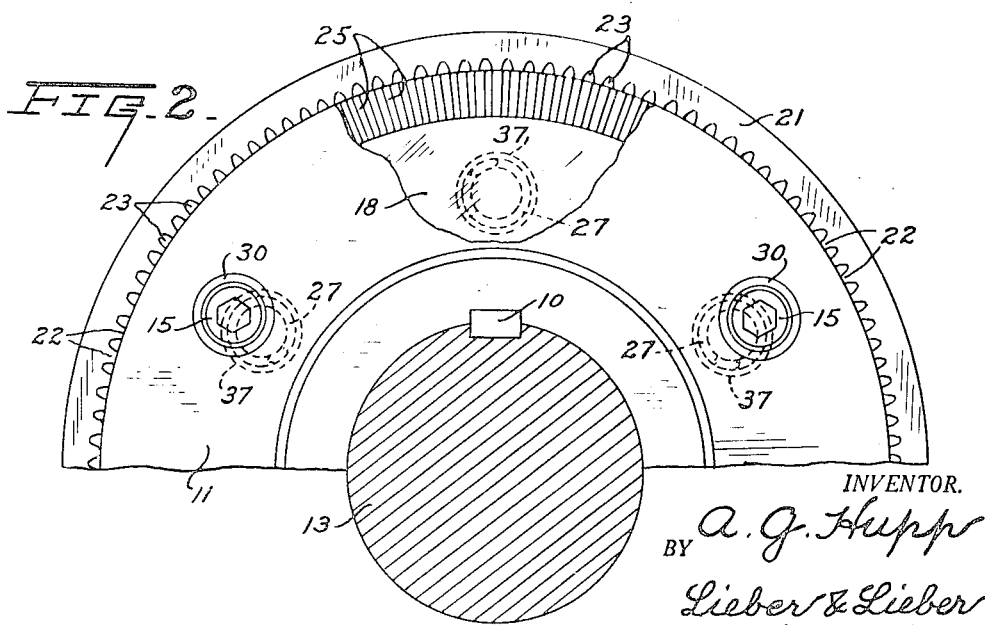
Fig. 2 is a fragmentary end view of the clutch shown in Fig. 1, with a portion broken away to reveal the driving serrations of the armature.

Referring to Figs. 1, 2 and 5 of the drawings, the improved spring engaged and magnetically released type of clutch shown therein, comprises in general, a disc-like driving member 7 having a plane end surface 8 and a hub adapted to be secured to a driving shaft 9 by one or more keys 10; a similar disc-like driven member 11 having a plane end surface 12 spaced from the surface 8, and also having a hub adapted to be secured to a driven shaft 13 disposed coaxially of the shaft 9, by means of one or more keys 10; an electro-magnet disposed within the space between the member surfaces 8, 12 and having a body element 14 provided with a plane end surface coacting with and secured to the member surface 8 by cap screws 15, and also having a winding spool 16 and an energizing coil 17 attached thereto; an annular disc-like armature 18 movable along the hub 19 of a carrying or supporting element 20 also disposed between the surfaces 8, 12 and having a plane end surface coacting with and secured to the member surface 12 by other cap screws 15; a ring gear 21 having internal spur gear teeth 22 meshing with alined external teeth 23 formed upon the outermost peripheries of the armature 18 and upon the body element 14, the ring gear 21 being fastened to the element 14 by screws 24; an annular series of radial serrations 25 formed on one side of the armature 18 and being drivingly cooperable with an adjacent similar series of serrations 26 formed on the supporting element 20; and a series of helical compression springs 27 interposed between the opposite side of the armature 18 and the magnet coil 17.

The driving shaft 9 and the member 7 may be connected to any suitable source of rotary motion, and the coaxial driven shaft 13 and member 11 may be likewise connected to any desired machine or device to which rotary motion is to be imparted. The shafts 9, 13 and the members 7, 11 are preferably held against axial displacement or shifting, and in order to positively aline the driving and driven members 7, 11 and the elements 14, 20 which are detachably secured to these members respectively, the attaching cap screws 15 are accurately formed with cylindrical shanks 29 snugly fitting bored holes in the members 7, 11 and the heads of which clampingly engage lock washers 30, as shown in Fig. 1. The plane end surfaces 8, 12 of the driving and driven members 7, 11 and with which the adjacent end surfaces of the elements 14, 20 coact, are disposed parallel to each other and perpendicular to the common axis of the shafts 9, 13, so that by removing the cap screws 15 and the electrical connections for the electro-magnet, the magnet and armature supporting elements 14, 20 and all parts carried thereby, may be freely removed or applied to the clutch assemblage.

The magnet coil 17 may be provided with detachable slip-in terminals 32 connected to a collector ring 33 carried by the driving member 7, and may be energized from any suitable source of electric current at the will of an operator or by a control device, so that energization of the coil 17 will compress the springs 27 and will disengage the rotary motion transmitting serrations 25, 26. The coil 17 has relatively heavy end plates 34 which are welded or otherwise firmly secured to the body element 14 and to the spool 16, and the latter is also firmly attached to the element 14 by cap screws 35, see Fig. 1. As previously indicated, the ring gear 21 is detachably fastened to the magnet body element 14 by means of the screws 24 and has an annular series of internal teeth 22 extending therethrough and which snugly coact with an annular series of external gear teeth 23 formed integral with the periphery of the member 14.

The annular disc-like armature 18 is formed of magnetic material and is bored so as to loosely surround the hub 19 of the supporting element 20 so as to permit free floating movement of the armature disc along the shaft axis. The peripheral external gear teeth 23 which are formed integral with the armature 18 are disposed in alinement with the teeth 23 of the magnet body element 14 and are slidably cooperable with the internal gear teeth 22 of the ring gear 21 whereby the armature may move axially of the clutch but is positively rotated whenever the driving shaft 9 is rotating. The helical compression springs 27 which constantly urge the armature 18 away from the magnet body element 14, are spaced uniformly about the clutch axis and are confined in circular sockets 37 in the armature disc, as illustrated in Figs. 1 and 2, and the radial serrations 25 which are formed integral with the side of the armature remote from the sockets 37 and which are adapted to drivingly engage the similarly formed radial serrations 26 of the supporting element 20, are preferably shaped as depicted in Figs. 1 and 5 with parallel crests and bottoms.

When the spring engaged magnetic clutch of Figs. 1 and 2 has been properly constructed and installed as above described, and the driving shaft 9 is being rotated, the motion transmitting serrations 25, 26 may be brought into driving engagement by merely interrupting the magnet energizing electric current and thereby deenergizing the coil 17. The helical springs 27 will then force the armature 18 toward the right as shown in Fig. 1, and will cause the coacting serrations 25, 26 to impart rotary motion to the driven shaft 13 through the carrying or supporting element 20 and the adjacent member 11 and key 10. However, when the magnet coil 17 is energized, the magnet body element 14 will attract and cause the armature 18 to move freely toward the left and to compress the springs 27 until the serrations 25, 26 are disengaged whereupon the driven shaft 13 will be released from the driving source. The armature 18 will then rotate with the driving shaft 9, member 7, and element 14 without imparting rotary motion to the driven parts of the clutch, until the coil 17 is again deenergized to permit the springs 27 to act.

Referring to Figs. 3, 4 and 5 of the drawings, the improved magnetically engaged type of clutch shown therein, comprises in general, a disk-like driving member 7 having a plane end surface 8 and a hub adapted to be secured to a driving shaft 9 by a key 10 or the like; a similar driven member 11 also having a plane end surface 12 spaced from the member surface 8 and a hub adapted to be secured to a driven shaft 13 disposed in axial alinement with the driving shaft 9, by a key 10 or the like; an electromagnet located within the space between the member surfaces 8, 12 and having a body element 14' provided with a plane end surface coacting with and secured to the member surface 8 by an annular series of bolts 15, and also having a winding spool 16 and a magnet energizing coil 17 attached thereto; an annular disc-like armature 18' movable freely along a hub or bushing 39 secured within the winding spool 16; an armature carrying or supporting element 20' also disposed between the surfaces 8, 12 and having a plane end surface on one side coacting with and firmly secured to the member surface 12 by cap screws 15, and also having an annular series of stud bolts 40 projecting from its opposite side through openings in the armature 18'; a ring gear 21' having internal spur gear teeth 22 meshing with alined external teeth 23 formed upon the outermost peripheries of the armature 18' and upon the supporting element 20', and being fastened to the armature 18' by screws 24; an annular series of radial serrations 25 formed on one side of the body element 14' and being drivingly cooperable with a similar adjacent series of serrations 26 formed upon the ring gear 21'; and a series of helical compression springs 27' surrounding the stud bolts 40 and coacting with the heads of these bolts and with the armature 18'.

The remainder of the magnetically engaged and spring released clutch unit of Figs. 3 and 4 is substantially the same as that of the spring engaged and magnetically released clutch of Figs. 1 and 2, except that the modified structure of Figs. 3 and 4 may also be provided with a protective sleeve 42 secured to the ring gear 21' by screws 43 and providing a cover for the serrations 25, 26. The end of the bushing 39 of the modified clutch and which is nearest to the supporting element 20' may also be provided with a bearing plate 44, and a stop plate 45 may be interposed between the armature 18' and the element 20' adjacent to each of the stud bolts 40. The serrations 25, 26 of the magnetically engaged clutch assemblage are preferably formed as shown in Fig. 5, and the internal and external gear teeth 22, 23 should also be formed to centralize the armature 18' and to permit free floating thereof along the central axis of the unit.

When the magnetically engaged clutch of Figs. 3 and 4 has been properly constructed and installed as above described, and the driving shaft 9 is rotating, the motion transmitting serrations 25, 26 may be brought into driving engagement by merely energizing the coil 17. The magnet body element 14' will then attract and move the armature 18' together with the gear ring 21', toward the left as viewed in Fig. 3, thereby causing the springs 27' to be compressed and the serrations 26 to drivingly engage the serrations 25, thus imparting rotary motion to the driven shaft 13 through the stud bolts 40, supporting element 20' and the adjacent member 11 and key 10. Whenever the coil 17 is deenergized, the helical compression springs 27' will become quickly effective to move the armature 18' and the ring gear 21' toward the right so as to quickly disengage the serrations 25, 26 and to thereby interrupt the driving connection. The floating armature 18' will then be arrested with the driven shaft 13 until the coil 17 is again energized to reestablish the driving connection.

The formation of the driving and driven members 7, 11 with spaced parallel adjacent end surfaces 8, 12 disposed perpendicular to the common axis of the shafts 9, 13, and which are devoid of recesses and projections coacting with projections and recesses of the magnet body and armature supporting elements, is of considerable importance in facilitating assembly and dismantling of these improved magnetic clutch units without disturbing the shafts 9, 13 and the driving and driven members. In order to effect such operations it is only necessary to remove the electric terminals 32 and the cap screws 15, whereupon the parts normally confined between the plane surfaces 8, 12 may be freely inserted or withdrawn laterally of the shaft axis. If so desired, identical driving and driven members 7, 11 may be utilized in either type of clutch, and the construction of the cap screws 15 with snug fitting cylindrical shanks 29 is also important in order to insure accurate centering of the armature and clutch elements.

The use of serrations 25, 26 formed as shown in Fig. 5 is also important in order to enable the magnet and the coil springs to function properly; and the annular series of cooperating inner and outer gear teeth associated with the assemblage remote from the central axis, insures free floating of the armature disc and displacement thereof along the clutch axis by the springs and by magnetic influence with minimum effort. It is to be noted that the crests of the serrations 25, 26 are round while the bottoms of the intervening valleys are flat, thus producing driving contact only along the opposite flat side surfaces thereof and preventing possible jamming and sticking of the serrated parts when being drivingly interconnected while also facilitating rapid separation thereof. In the clutch of Fig. 1, the ring gear 21 normally covers and conceals the serrations 25, 26, while the annular sleeve 42 affords such protection in the modified clutch of Fig. 3.

Both of the improved clutches comprise relatively simple parts which may be readily machined with standard equipment, and thereafter assembled to produce precision built units. The serrations 25, 26 and the gear teeth 25, 26 may be accurately formed by broaching or milling, and the remaining parts may likewise be accurately machined on a lathe and by drilling. Considerable difficulty has heretofore been encountered in the production of a spring engaged magnetic clutch due to the fact that the spring tension could not be varied and it required enormous magnetic force to move the armature toward the magnet poles when the magnetic gap was at its maximum. These difficulties have however been entirely overcome with the improved structure of Figs. 1 and 2 wherein the springs 27 are interposed directly between the coil 17 and armature 18 remote from the motion transmitting serrations 25, 26 and these serrations are formed with their tops and bottoms parallel to each other.

From the foregoing detailed description it will be apparent that the present invention provides various improvements in the construction and operation of magnetic clutches of either the spring or magnetically engaged type, whereby the construction of such devices is facilitated and the functioning thereof is vastly improved. The improved clutch units may be manufactured in various sizes and for diverse uses at moderate cost, and all parts thereof while being normally well concealed and protected are still readily accessible for inspection or replacement. The improved structures have proven highly satisfactory and successful in actual use; and it should be understood that it is not desired to limit the invention to the exact details of construction and operation herein specifically shown and described, for various modifications within the scope of the appended claims may occur to persons skilled in the art.

I claim:

1. In a magnetic clutch, driving and driven coupling members rotatable about a common axis, an electromagnet having a body element drivingly attached to one of said members and an annular coil secured to said element, an armature having a mounting element drivingly attached to the other of said members, said armature being movable away from its supporting element and toward said electro-magnet when the latter is energized and having thereon an annular series of parallel peripheral external gear teeth, a ring gear surrounding said armature and having an annular series of internal gear teeth coacting with said external armature teeth and being detachably secured to one of said elements, and an annular series of helical compression springs interposed between said coil and said armature.

2. In a magnetic clutch, driving and driven coupling members rotatable about a common axis, an electromagnet having an annular coil and a disc-like body element carrying said coil and drivingly attached to one of said members, an annular armature having a disc-like mounting element drivingly attached to the other of said members, said armature being movable along said axis away from its mounting element and toward said electro-magnet whenever the latter is energized and said armature and said body element both having thereon annular series of parallel peripheral external gear teeth, a ring gear secured to one of said elements and surrounding said armature and having an annular series of internal gear teeth meshing with and slidable along said external armature and element teeth and being axially removable to disconnect said magnet and armature, and an annular series of compression springs interposed between said coil and said armature.

3. In a magnetic clutch, driving and driven coaxial rotary coupling members, an electro-magnet having a body element drivingly attached to one of said members and also having an annular energizing coil secured within said body element, an annular armature having a mounting element drivingly attached to the other of said members, said armature being movable away from its supporting element and toward said electro-magnet when the latter is energized and being provided with one annular series of parallel peripheral external teeth and with another annular series of radial teeth adjacent to one side thereof adapted to coact with a similar series of radial teeth formed on the adjacent side of one of said elements, a ring gear surrounding said armature and having an annular series of internal teeth coacting with said peripheral external armature teeth and being detachably secured to one of said elements, and helical compression springs interposed between said coil and said armature to move said armature away from said electro-magnet when the latter is de-energized.

References Cited in the file of this patent

UNITED STATES PATENTS

| | | |
|---|---|---|
| 1,285,809 | Seyfert | Nov. 26, 1918 |
| 1,629,304 | Price | May 17, 1927 |
| 1,664,190 | Coldwell | Mar. 27, 1928 |
| 1,989,984 | Hope | Feb. 5, 1935 |
| 2,055,723 | Hope | Sept. 29, 1936 |
| 2,057,876 | Berry | Oct. 20, 1936 |
| 2,308,370 | Kellett et al. | Jan. 12, 1943 |